United States Patent [19]
May

[11] Patent Number: 4,719,621
[45] Date of Patent: Jan. 12, 1988

[54] PACKET FASTBUS

[75] Inventor: David C. May, Hopkinton, Mass.

[73] Assignee: Raytheon Company, Lexington, Mass.

[21] Appl. No.: 755,113

[22] Filed: Jul. 15, 1985

[51] Int. Cl.$^4$ .............................. H04J 3/02; H04J 3/24
[52] U.S. Cl. ......................................... 370/85; 370/94
[58] Field of Search .................... 370/85, 88, 94, 94 U; 340/825.5

[56] References Cited

U.S. PATENT DOCUMENTS 4,535,450  8/1985  Tan ........................................ 370/94
4,568,930  2/1986  Livington et al. ..................... 370/85
4,586,175  4/1986  Bedard et al. ......................... 370/85

OTHER PUBLICATIONS

Technology Update by Barrie Nicholson, *EDN*, Feb. 23, 1984, pp. 55-74.

Microsystem Boards, John Javetski, *Electronic Products*, Jul. 2, 1984, pp. 57-61.

Primary Examiner—Douglas W. Olms
Assistant Examiner—Frank M. Scutch, III
Attorney, Agent, or Firm—Walter F. Dawson; Richard M. Sharkansky

[57] ABSTRACT

A digital system comprising a synchronous fastbus for interconnecting a cluster of devices such as processors and for interconnecting a plurality of said clusters. Information is transferred over the synchronous fastbus using a parallel digital word information packet. All required bus control signals including acknowledge and non-acknowledge signals take place within the same packet transfer fastbus cycle time. A command information packet is transferred over the fastbus separately from a response information packet thereby leaving the fastbus free until a response packet is returned to the requestor. During the interim other devices are allowed to access the fastbus, thereby increasing significantly fastbus utilization.

24 Claims, 12 Drawing Figures

INFORMATION PACKET 80

| NODE ID 8 | PACKET TYPE 2 | ADDRESS 24 | DATA 16 | CONTROL 4 | SPARE 3 | PARITY 7 |
|---|---|---|---|---|---|---|

FIG. 5B

| | | | | | | | |
|---|---|---|---|---|---|---|---|
| 8 | 2 | 24 | 16 | 4 | 3 | 7 | PACKET BITS PER FIELD 82 |
| I | T | ADDRESS 24 | DATA | C | S | P | COMMAND PACKET 83 (24-BIT ADDRESS) |
| I | T | ADDRESS 32 | -- | C | S | P | 32-BIT ADDRESS PACKET 84 |
| I | T | DATA 32 | -- | C | S | P | 32-BIT DATA PACKET 85 |
| I | T | INFORMATION 40 | | C | S | P | 40-BIT INFORMATION PACKET 86 |

PACKET FASTBUS

BACKGROUND OF THE INVENTION

This invention relates generally to a digital system comprising a plurality of processors and other devices, and in particular to a bus apparatus for interconnecting a plurality of said processors forming a cluster and for interconnecting a plurality of clusters.

A shared bus is one of the most common multiprocessor interconnection schemes and still remains an attractive way of interconnecting small numbers of microprocessors. The simplest form of a shared bus is embodied in standards such as the IEEE-796 standard which is an asynchronous non-multiplexed bus. A shared bus typically employs a fixed position-dependent priority scheme and has limited bandwidth because the bus is always allocated for one complete processor memory cycle. If the processors have no local memory, then the bus will saturate with only two or three active processors. Performance has been greatly improved if code is kept in local memory, but system bandwidth is still limited by the processors memory cycle rather than by bus or memory bandwidth.

Microprocessor bus designs in the prior art simply allocated the required busses for the total period required to complete the processor memory cycle. A processor in one cluster reading a global memory in a second cluster occupied its own cluster bus and the system bus from the time they were first granted to transfer the request until the global memory was read and the word transferred back to the requesting processor. Only a small portion of this total time was utilized for transferring the request and the response over the busses. This approach resulted in high bus utilizations relative to the actual transfer rates realized.

Digital systems based on shared busses have been improved by several methods. In a general purpose system where processors are deemed equal, splitting a memory read cycle into halves, that is, a send/request address packet and a receive/response data packet, allows full utilization of the bus with a minor increase in logic at the processor and memory interfaces. Such an approach incorporated with rotating priority bus arbitration maximizes the usefulness of a shared bus, but limits the bus to supporting only tens of processors. The only way to make such a system extensible almost without limit is to allow the busses to be interconnected. However, circuit switching for interconnecting busses has significant deadlock potential.

A synchronous parallel bus is certainly not new in a digital system. However, often the bus is multiplexed whereby it can take up to several adjacent bus cycles to complete a read or write operation.

SUMMARY OF THE INVENTION

In accordance with the present invention, a synchronous fastbus is provided for interconnecting a plurality of devices forming a cluster and for interconnecting a plurality of clusters forming a more computationally powerful digital system. An information packet is generated by any one of the devices and the information packet comprises a parallel digital word having fields for identifying the type of information packet and its destination address along with a data field and error signal field. A command information packet generated by a first device may request information in one fastbus cycle time from a second device occupying any one of the fastbusses. The second device may generate a response information packet and occupy the fastbus at some other point in time for one fastbus cycle time. During the intervening periods of time the fastbus is used by other devices. A bus coupler having at least two ports provides the interconnecting means between a cluster fastbus and system fastbus for temporarily storing and then forwarding the information packets to their specified destinations. The bus coupler may also comprise a third port for connecting to a global memory system.

In a preferred embodiment of the invention the bus coupler comprises first-in first-out (FIFO) buffers for temporarily storing and routing the information packet to and from the cluster fastbus and the system fastbus. Transmit control means and receive control means at each fastbus interface of the bus coupler provide the necessary control for information packet fastbus transfers. Arbiter means at each fastbus interface of the bus coupler determines when a device or node obtains use of the cluster or system fastbusses.

In accordance with a further feature of the invention, a method is provided for transferring parallel digital information among a plurality of devices arranged in clusters within a digital system comprising the steps of generating in a first one of said plurality of devices an information packet comprising a plurality of fields including address, data and control fields, transferring the information packet on a synchronous cluster fastbus means interconnecting said plurality of devices within one fastbus cycle time, and storing and forwarding the information packet in a bus coupler means coupled to a synchronous system fastbus means, such bus coupler means having at least a first port and a second port. The step of storing and forwarding the information packet comprises routing the information packet to the synchronous system fastbus for transfer to a second one of the plurality of devices in one of said clusters, such transfer occurring within one fastbus cycle time.

BRIEF DESCRIPTION OF THE DRAWINGS

The above-mentioned aspects and other features of the invention are explained more fully in the following description taken in connection with the accompanying drawings in which.

DESCRIPTION OF THE PREFERED EMBODIMENT

Figure 1:
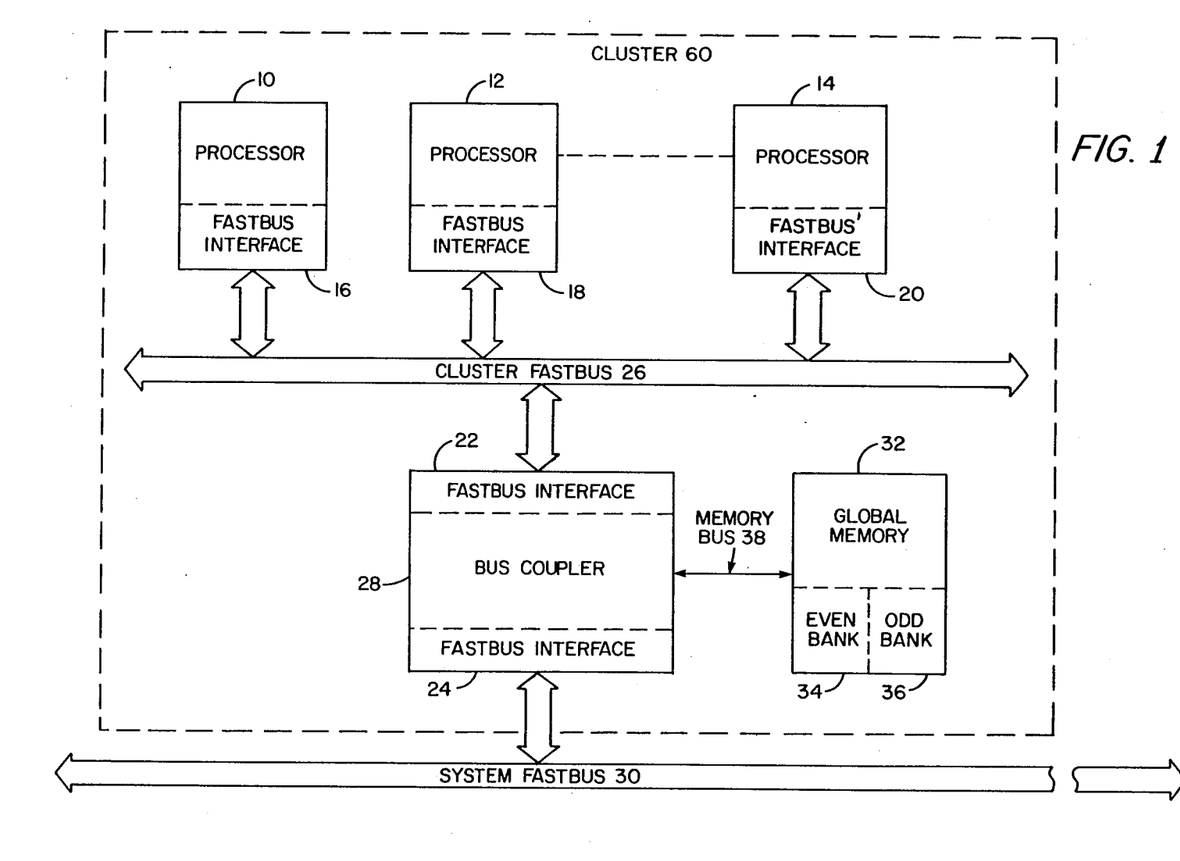
FIG. 1 is a functional block diagram of a fastbus cluster network comprising a bus coupler for routing information packets to and from a cluster fastbus, a system fastbus and a memory bus.

Referring first to FIG. 1, there is shown a block diagram of a synchronous packet bus cluster 60 network comprising a cluster fastbus 26 for interconnecting a plurality of devices such as processors 10-14 and for connecting to a bus coupler 28. Each device connected to the cluster fastbus 26 comprises a fastbus interface 16-22. The bus coupler 28 comprises ports for routing information packets to and from not only the cluster fastbus 26, but also a system fastbus 30 and a global memory 32. The bus coupler 28 is responsible for queuing in-cluster and out-of-cluster global memory requests and for forwarding all other out-of-cluster (both incoming and outgoing) memory requests as well as message packets. In the preferred embodiment, up to 16 devices are allowed on each cluster fastbus 26. The fastbus interface 24 of the bus coupler 28 port connected to the system fastbus 30 is the same as the aforesaid fastbus interfaces 16-22. The cluster fastbus 26 and system fastbus 30 are each a synchronous parallel packet bus and each device interfacing to a fastbus operates in both a transmit and a receive mode. This is an important feature of the invention because requests and responses on the fastbusses 26 and 30 are separated, thereby leaving each fastbus available after a request has been transmitted until a response is returned to the requestor.

The global memory 32 is coupled to the bus coupler 28 by a conventional memory bus interface port. The global memory 32 may have memory banks interleaved on an even/odd word boundary which effectively can double the memory bandwidth by allowing a 50/50 probability of two simultaneous memory cycles occurring in parallel. If a memory cycle is 300 ns for the global memory, then the effective memory cycle for a cluster bank interleaved memory approaches 150 ns which is the clock rate for the cluster fastbus 26 and system fastbus 30 in the present preferred embodiment.

Figure 2:
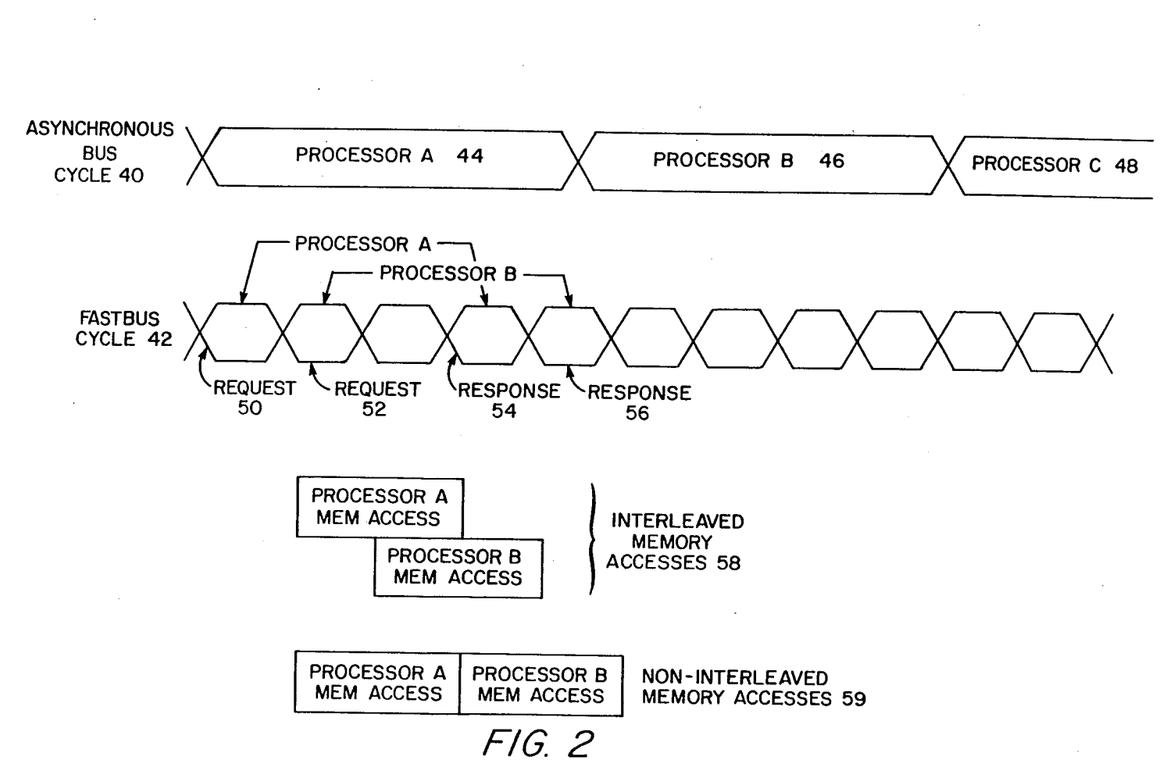
FIG. 2 shows a cycle time comparison of an asynchronous bus versus a fast bus with and without interleaved memory accesses.

Referring now to FIG. 2, an asynchronous bus cycle 40 is compared to a synchronous fastbus cycle 42. Processor A ties up the asynchronous bus cycle 40 for a complete processor cycle in order to accomplish an information transfer. However, with a synchronous fastbus cycle 42, information request cycles 50 and 52 are separated from response cycles 54 and 56 and they are shorter cycles resulting in higher rates of information transfer. In addition, when the global memory 32 has banks for interleaved memory accesses 58 instead of non-interleaved memory accesses 59, shorter memory accesses may be achieved, effectively doubling memory bandwidth.

Figure 3:
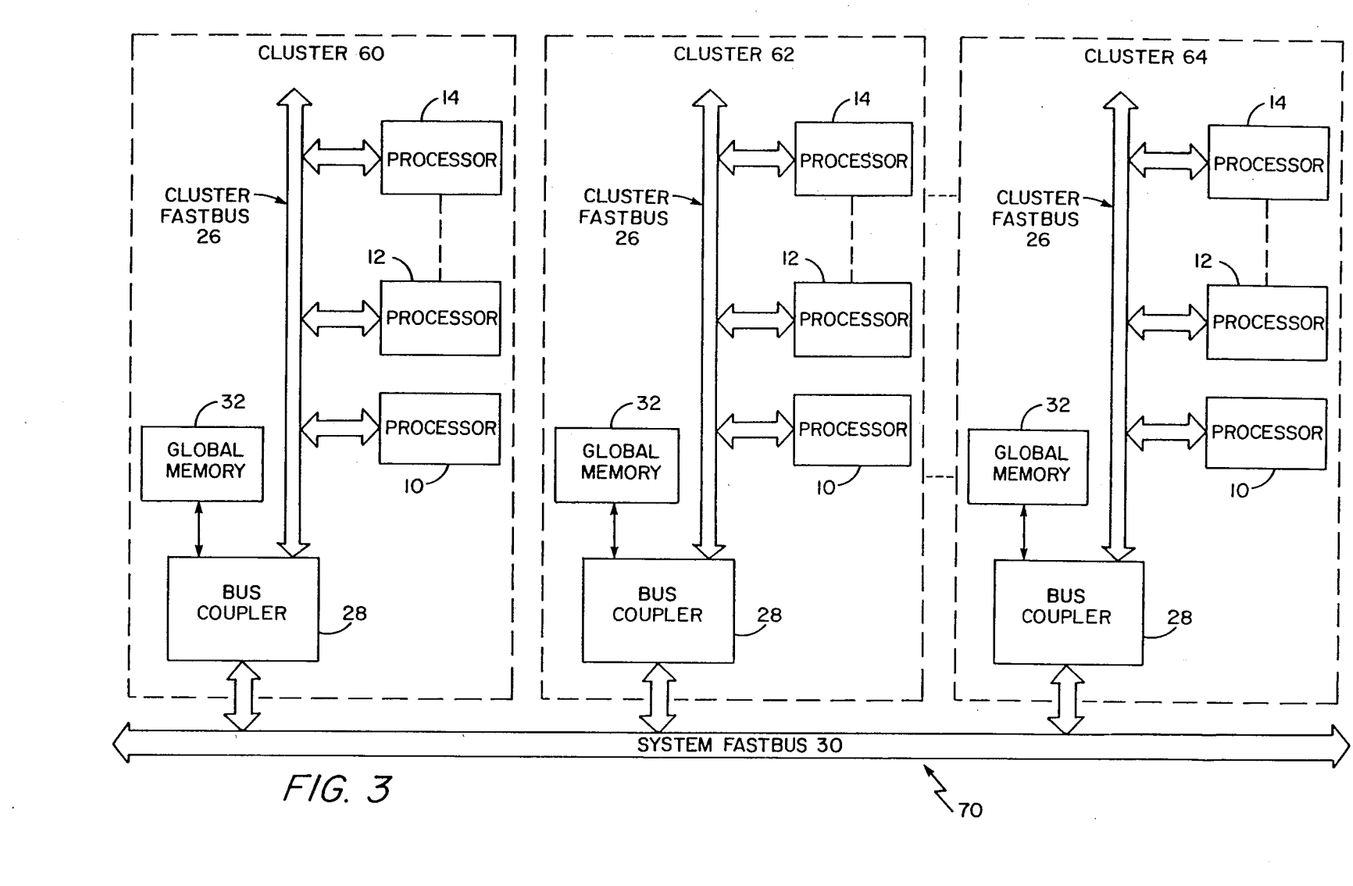
FIG. 3 is a block diagram of a digital system employing a plurality of fastbus clusters interconnected by a system fastbus.

Referring now to FIG. 3, there is shown a digital system 70 comprising a plurality of clusters 60-64 interconnected by the system fastbus 30. Each one of the clusters comprises the cluster fastbus 26 for interconnecting a plurality of processors 10-14 and the bus coupler 28 or for interconnecting a plurality of input-output devices such as communication devices or peripheral equipment devices (not shown, but known to one skilled in the art) to a bus coupler 28. Each processor 10-14 in a cluster 60-64 is considered a node from which global memory 32 requests are initiated and at where the processing functions for the system 70 are performed. The requests can be directed to the global memory 32 within the processor's own cluster 60 or to a global memory 32 within any other cluster 62-64 connected to system fastbus 30. During a global memory 32 access, the cluster fastbus 26 or system fastbus 30 allows other devices to access the fastbusses while the global memory 32 is completing a memory access cycle. In the preferred embodiment, there may be up to 16 clusters 60-64 connected to the system fastbus 30 via the respective bus coupler 28 in each cluster.

Figure 4:
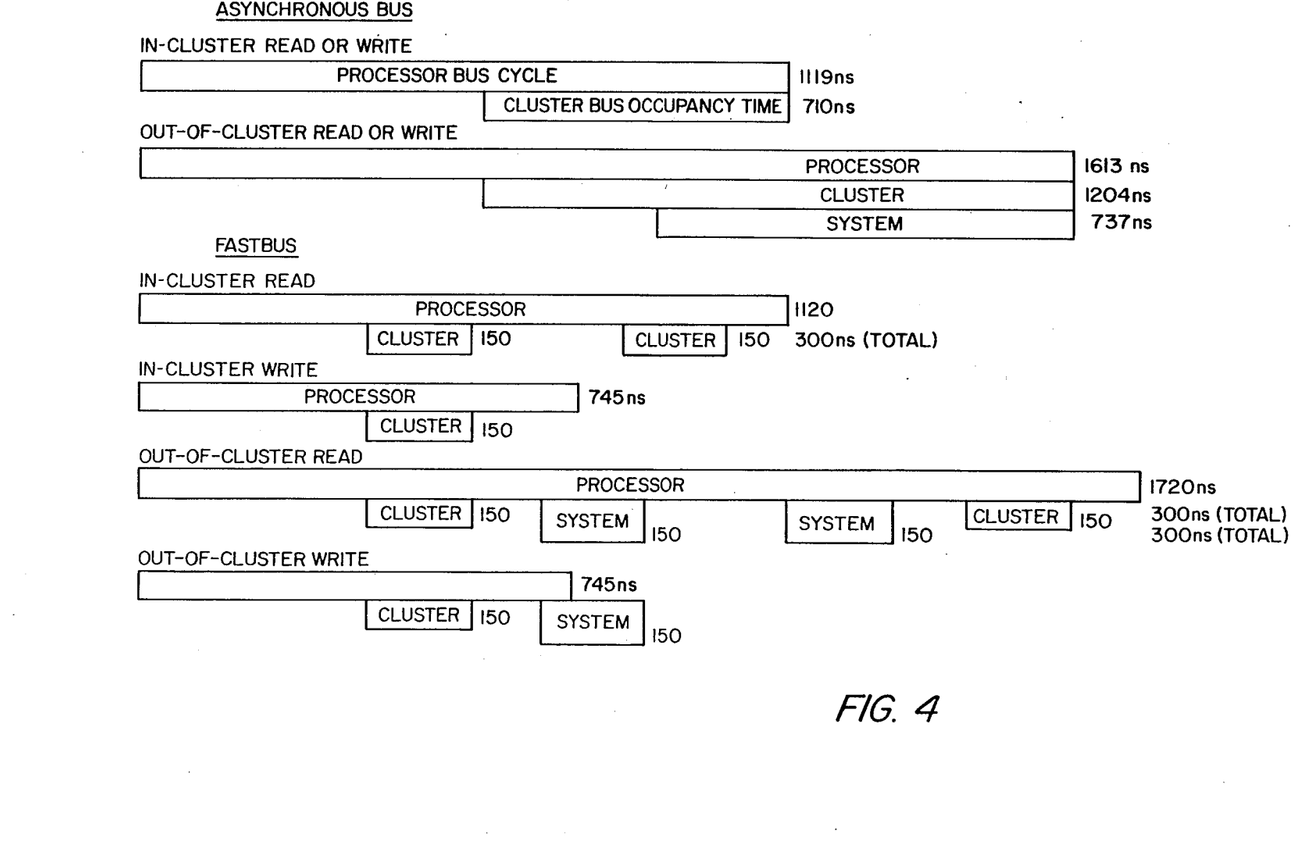
FIG. 4 shows a comparison of bus occupancy times for an asynchronous bus versus a fastbus during in-cluster and out-of-cluster operations.

Referring now to FIG. 4, relative time periods are shown for in-cluster and out-of-cluster bus occupancy for the fastbus of the present invention versus an asynchronous bus during read and write operations. The fastbus approach provides the ability for occupying each cluster fastbus 26 on the system fastbus 30 for only the time used in transferring a request or a response over the respective fastbusses. The asynchronous bus allocates the busses for a particular operation for the total period required to complete the operation. For example, as shown in FIG. 4, for the asynchronous bus out-of-cluster read or write operation, a processor in one cluster reading a memory in another cluster occupies its own cluster bus and the system bus from the time they are first granted the request until the global memory being requested is read and a word is transferred back to the requesting processor. Only a small part of this total time is utilized for transferring the request and the response over the asynchronous busses resulting in high bus utilization relative to the actual transfer rates realized. The fastbus only utilizes the cluster and system fastbusses 26, 30 when an actual transfer over either one or both the fastbusses is required for an operation. For example, as shown in FIG. 4 and referring to FIG. 3, a fastbus out-of-cluster read operation occupies the fastbusses for a total of 600 ns. The processor 10 in cluster 60 first acquires its cluster fastbus 26 passing a request packet to the bus coupler 28 and releasing the bus in one clock cycle of 150 ns. Then the bus coupler 28 acquires the system fastbus 30, and the request packet is passed to the bus coupler 28 of cluster 62 in which the addressed memory resides. The system fastbus 30 is released after being occupied for one clock cycle of 150 ns. The bus coupler 28 of cluster 62 sends the request packet to a global memory 32 in cluster 62 and a memory read cycle is initiated. After the memory read cycle is completed, the bus coupler 28 in cluster 62 acquires the system fastbus 30 again and a response packet comprising data from the memory 32 is transferred to the requesting bus coupler 28 in cluster 60 and the system fastbus 30 is released after again being occupied for one clock cycle of 150 ns. Finally, the bus coupler acquires the cluster fastbus 26 of cluster 60 and passes the response packet to the requesting processor 10 and then releases the cluster fastbus 26, having occupied it for one clock cycle of 150 ns. Hence, the total bus occupancy is 300 ns on the cluster fastbus 26 versus 1204 ns on the asynchronous cluster bus and 300 ns on the system fastbus 30 versus 737 ns on the asynchronous system bus.

Figure 5A:
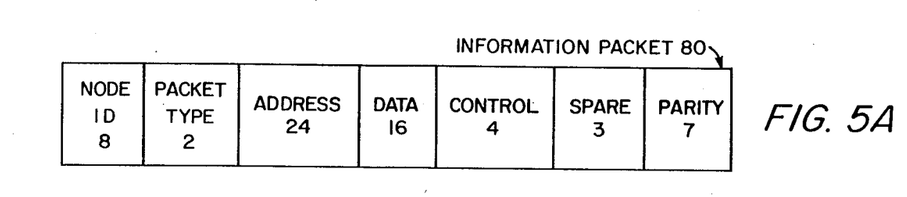
FIG. 5A depicts the fields of an information packet, defines the number of bits in each field and the functions of the fields.

Referring now to FIG. 5A, there is shown a parallel information packet 80 comprising seven fields and having a total of 64 bits. A node identification (ID) field comprises 8 bits and specifies the physical location (back plane strap option) of a device within a digital system 70 such as is shown in FIG. 3. The node ID field specifies a specific one of a plurality of devices in any one of a plurality of clusters 60–64. In the preferred embodiment, there may be a maximum of 16 nodes in a cluster and 16 clusters per system for a total of 256 nodes. The purpose of the node ID is for the proper routing of packets to their final destination as well as for providing diagnostic information as to the source of a parity error. There are several types of packets which will be described hereinafter and one of these is a command packet. During the operation of a command packet in which a device is making an out-of-cluster global memory read request, the global memory, after completing the memory read cycle, passes the response packet back to the originating cluster and the in-cluster node from which the request was initiated. This is accomplished by saving the command packet node ID (source ID) and using it as the node ID (destination ID) in the subsequent response packet. The most significant (MS) nibble in the node ID specifies the cluster and the least significant (LS) nibble specifies the in-cluster node. A node ID word of all ones is reserved for a broadcast mode which allows urgent system status information to be received simultaneously at all device nodes whereby proper degradation or recovery actions may be initiated (e.g. a power fail is eminent).

The packet-type field consists of 2 bits and is encoded as follows:

| Code | Packet Type | Function |
|------|-------------|----------|
| 00 | command | request for memory read or write |
| 01 | response | response from memory read command or DMA read |
| 10 | message | passing encoded interprocessor messages |
| 11 | DMA transfer | DMA transfer set up and control |

A command packet sends a memory data read or write request typically to a global memory 32 and also to any other similar device in a cluster 60-64 or within a digital system 70. A response packet is the response, for example, to a data read request command. A message packet is used to allow devices to send messages to each other. The message packet provides for interprocessor interrupt passing and typically is used for processor to processor, processor to I/O, or I/O to processor "signaling" for task status information such as start-up or completion. The DMA transfer packet provides for the set-up and control of a direct memory access (DMA) transfer of information. The bus couplers 28 of the digital system 70 direct all inter and intra cluster and memory bus traffic. When a command packet is on a cluster fastbus 26, the bus coupler 28 inspects the packet address field for an in-cluster access or inspects the address field for an out-of-cluster access. If an out-of-cluster access is requested, the bus coupler 28 accepts the information packet after a parity check and subsequently initiates a system fastbus 30 transfer cycle. The packet-type field is also used to identify whether the node ID is a source or a destination ID. If a command packet is initiated from a processor, then the node ID field contains the source processor node and cluster ID from which the memory request was initiated. The global memory 32 will then use this as the destination ID in the response packet containing the memory data on the return fastbus cycle for the requested read memory operation. In a message packet, the node ID field contains the destination node ID and the least significant byte of the address field can contain the source node ID.

Figure 5B:
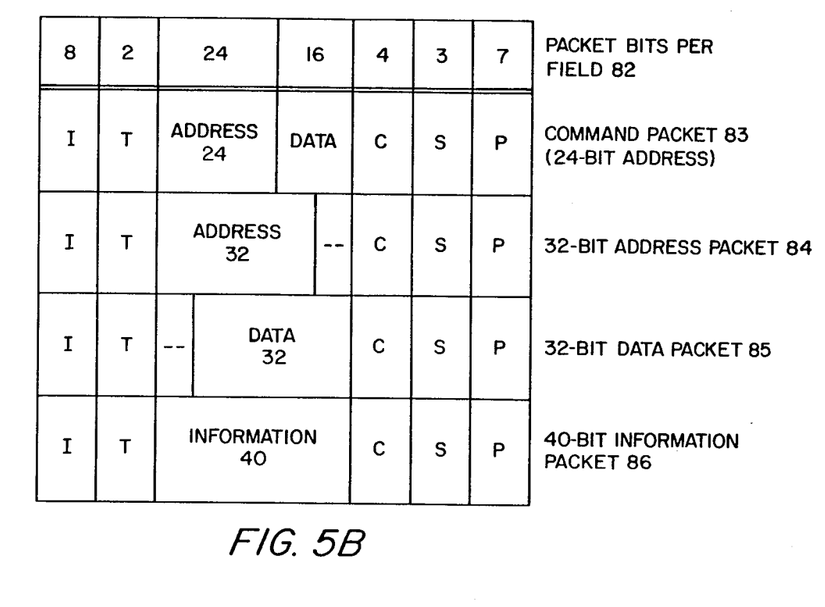
FIG. 5B depicts the variations in the address and data fields of an information packet during the various packet-type operations.

Referring now to FIGS. 5A and 5B, the address field of an information packet 80 varies in bit length, depending on the packet type operation being performed. In a command packet 83, the address field has 24 bits for a global memory read or write operation along with a 16-bit data field. However, once a read request operation has occurred, the processor has no further need for the address field so the address field may be used for 32-bit or 40-bit transfers in conjunction with the data field. In a message packet, the least significant 8 bits of the address field may contain the source ID of the processor or I/O device sending the message packet. For 32-bit data write operations, the address and data fields are multiplexed, but the 32-bit read request only requires the address packet. In addition, if the destination node does not require address information, then up to 40 bits of information can be transferred in one information packet 86. The data field of the information packet 80 comprises 16 bits, but can be extended to 32 or 40 bits as shown in FIG. 5B and described above. It may contain memory write data, memory read data, message data or DMA write data.

Still referring to FIG. 5B, the control field of the information packet 80 contains 4 one-bit fields whose definition is dependent upon the type packet. The control field encoding is as follows:

| Type Packet | bit3 | bit2 | bit1 | bit0 |
|-------------|------|------|------|------|
| Command | R/W | RMW | SIZE1 | SIZE0 |
| Response | TBD | ERROR | DSACK1 | DSACK0 |
| Message | TBD | TBD | TBD | TBD |
| DMA | R/W | ADDR/DATA | SIZE1 | SIZE0 |

For the command packet, the R/W (read—positive logic 1, write—positive logic 0) determines the memory operation to be performed and in most cases is simply a reflection of the processor control line state. The PMW bit signifies a read-modify-write cycle. The fastbus global memory 32 read-modify-write processing is split between the processor 10-14 and global memory 32. The processor 10-14 performs a normal read cycle, does a processor internal modify (sets the sign bit within the addressed byte), and attempts to perform a subsequent write operation back to the global memory 32. The fastbus digital system 70 has a more time efficient protocol, in that the memory performs the read-modify-write cycle itself, and takes the same cycle time to complete as does a normal read or write. Thus, the processor write (after modify) cycle is not transmitted on the fastbus and is discarded. The SIZE0 and SIZE1 bits are encoded as follows:

| Bit definition | Function |
|----------------|----------|
| 00 | 8-bit transfer request |
| 01 | 16-bit transfer request |
| 10 | 32-bit transfer request |

-continued

| Bit definition | Function |
|---|---|
| 11 | 40-bit transfer request |

This allows 8-, 16- or 32-bit transfers to be perfomred by 8-, 16- or 32-bit processors or 40-bits from an I/O device.

The response packet control bit encoding allows for error status to be transmitted back to the requesting node. The error bit indicates that a successful retry due to parity error occurred. This bit notifies the system that the "quality" of the busses is degrading. This may indicate an imminent bus transceiver failure, backplane is becoming noisy or an EMI transient occurred. The DSACK0 and DSACK1 bits indicate the size of the memory response being returned to the requestor and they are encoded as follows:

| Bit definition | Function |
|---|---|
| 00 | 8-bit response transfer |
| 01 | 16-bit response transfer |
| 10 | 32-bit response transfer |
| 11 | 40-bit response transfer |

These control bits allow a 32-bit processor to interface to 8-bit or 16-bit memory. Under control of the processor, if the response does not contain the full number of bytes requested (1, 2, 4 or 5), then the processor must make subsequent memory requests until the total number of bytes required has been received. All 4 control bits for the message packet are available for future options.

For a DMA packet, the R/W bit (read - positive logic 1, write—positive logic 0) determines the memory operation to be performed by the destination DMA circuitry. The address/data bit (address—positive logic 1, data—positive logic 0) indicates whether the DMA packet contains a DMA set-up address or the DMA transfer data for a write operation. An address register is set up prior to the actual data transfer. When data transfer begins, at the end of each data packet receipt, the address register is incremented. Thus, the sequence looks like—address, data, data . . . data. The SIZE0 and SIZE1 bit definition is the same as indicated above for the response packet.

Figure 6:
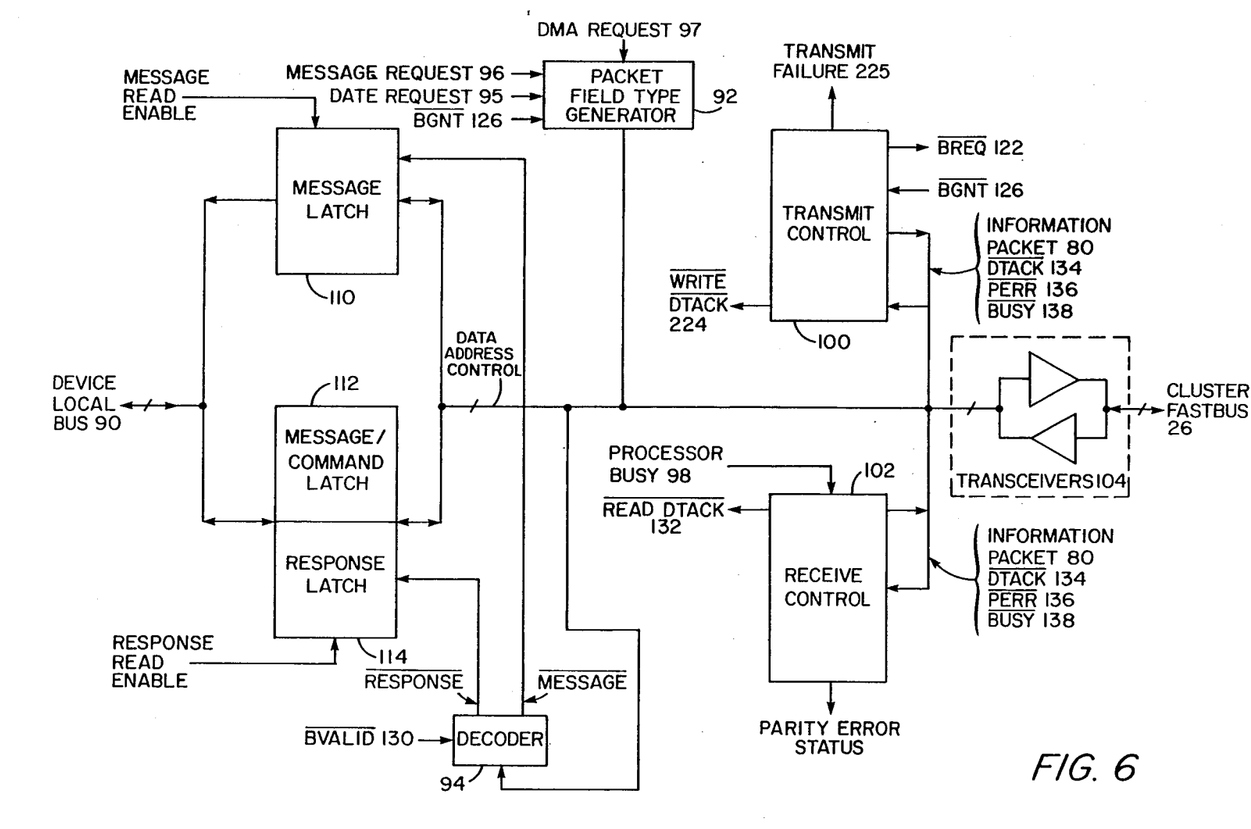
FIG. 6 is a block diagram of the fastbus interface logic of the invention between a processor 16-20 and the cluster fastbus 26.
Figure 7:
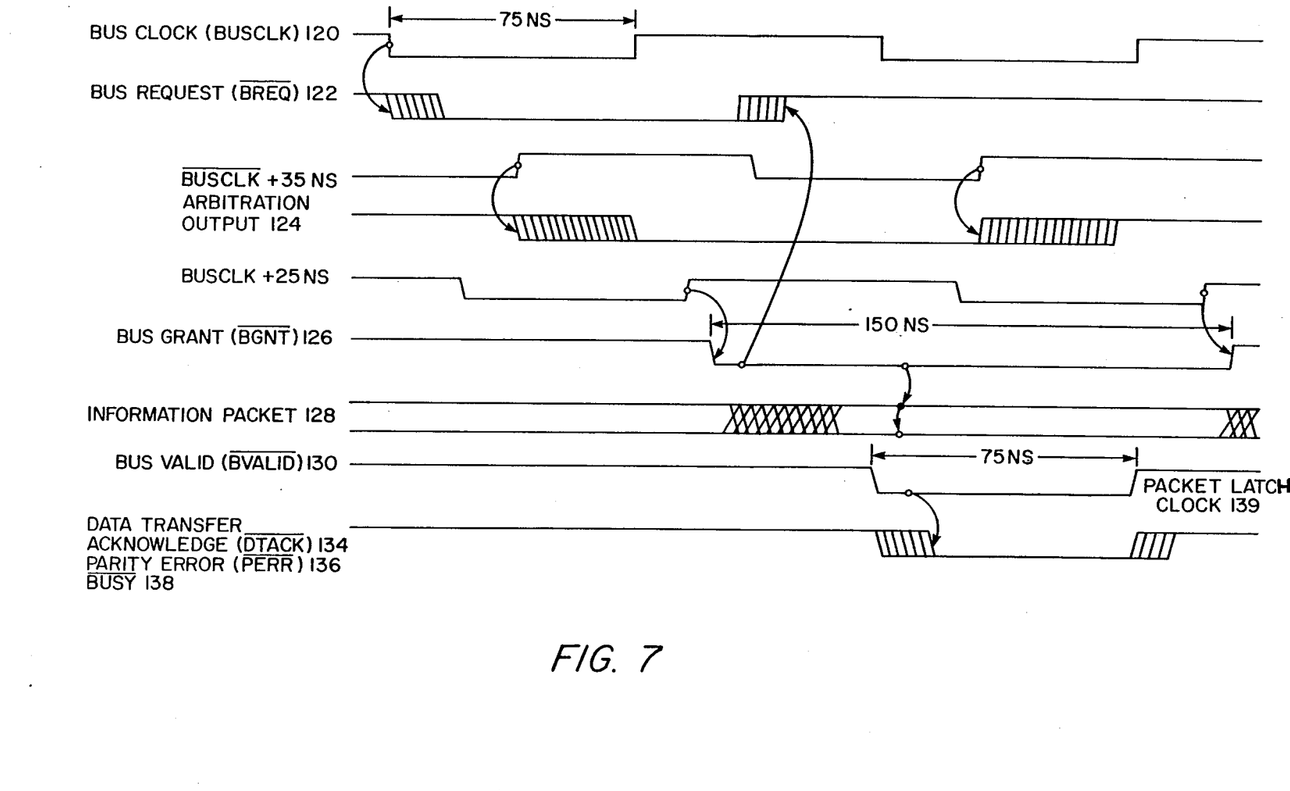
FIG. 7 is a fastbus timing diagram for the transmit and receive logic shown in FIGS. 9 and 10.

Referring now to FIGS. 6 and 7, there is shown a block diagram of the fastbus interface 16–24 and a fastbus timing diagram, respectively. The fastbus interface control signals include a bus clock (BUSCLK) 120 and six control signals. The source of the bus clock for the cluster of fastbus 26 is from the bus coupler 28 within that cluster. The source of the bus clock for the system fastbus 30 is derived from one of the bus couplers attached to the system fastbus. The bus clock 120 must be an integral submultiple of the access cycle time of the memory subsystem which here is the global memory 32 which maximizes but transfer efficiency by eliminating missed transfer cycles due to asynchronous clock skew. The six fastbus control signals are as follows:

| Signal | Description |
|---|---|
| BREQ | Bus request line |
| BGNT | Bus grant. This signal is used both to enable the information packet bus transceivers onto the bus and also to clear the |

-continued

| Signal | Description |
|---|---|
| | BREQ signal. |
| BVALID | Indicates a packet is on the bus and data is valid. This line is used to cause an addressed node to assert the DTACK and BUSY or PERR, if applicable. |
| DTACK | Data transfer acknowledge. Indicates a node on the bus has recognized its ID. |
| BUSY | The addressed device cannot accept the packet at this time due to a temporary busy condition caused by FIFO being full or previously received data is not processed yet. |
| PERR | Parity Error - generated when a parity error is detected by the addressed node. |

Figure 8A:
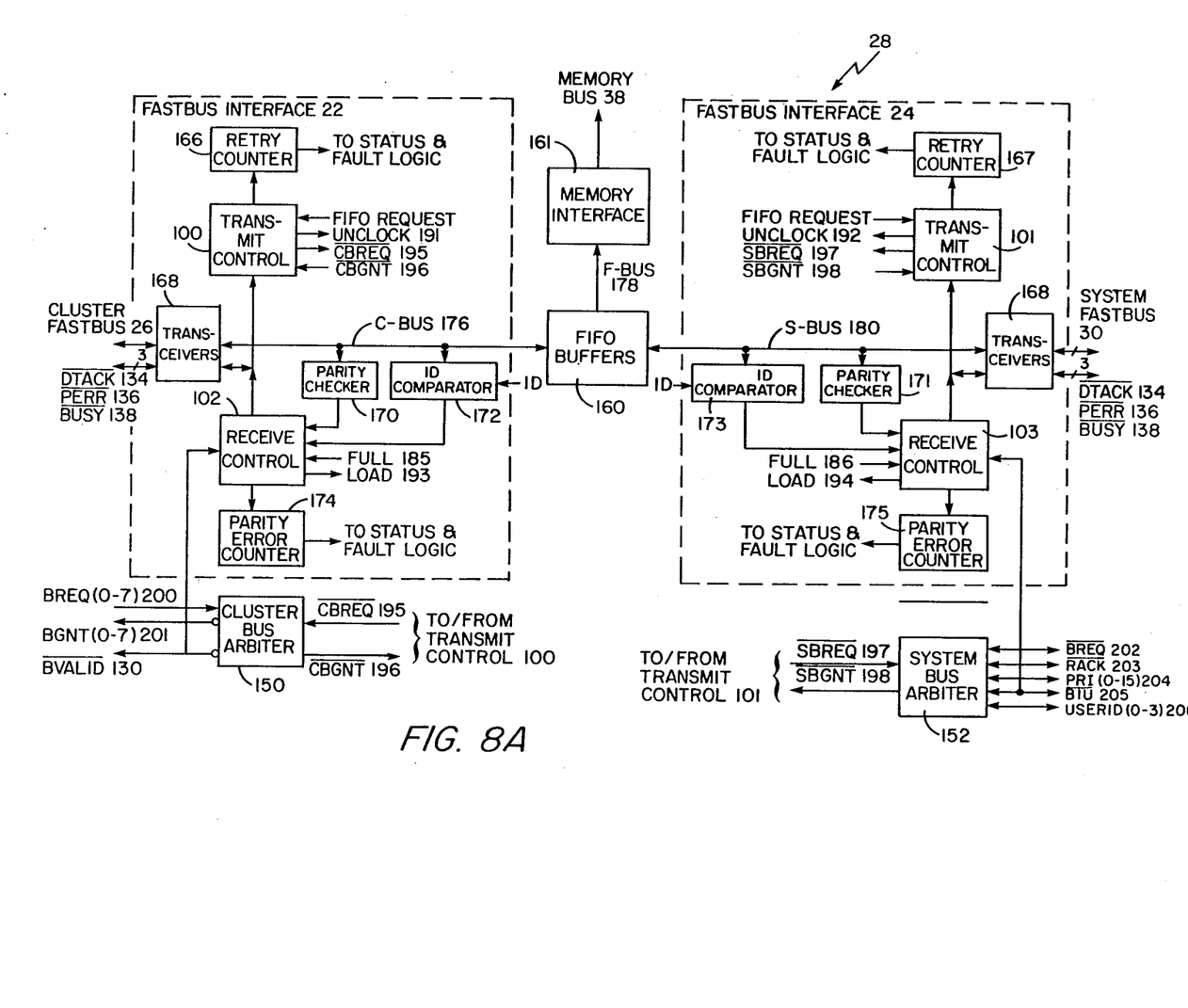
FIG. 8A is a block diagram of a bus coupler of the invention showing the fastbus interface 22 coupled to cluster fastbus 26, the fastbus interface 24 coupled to the system fastbus 30 and a third port of the bus coupler 28 interfacing to a memory bus 38.

Still referring to FIG. 6, the fastbus interface 16–20 comprises transceivers 104 which form the cluster fastbus 26 when a first port of a plurality of the transceivers 104 is connected together. A second port of said transceivers 104 connects to a transmit control 100 and receive control 102 for controlling information packet 80 transfers. A packet field type generator 92 generates the code for the type field of an information packet 80 during a transmit control 100 mode. A decoder 94 decodes the type field of an information packet 80 during a receive control 102 mode of operation. In addition, the fastbus interface 16–20 comprises a message latch 110, message command latch 112 and response latch 114 for providing appropriate control signals to the processors 10–14 or other devices to which it may be coupled. A command packet (global memory read or write) or a message packet initiates a bus request signal (BREQ/) 122 signal. When a bus grant (BGNT/) 126 is received, the transmit control passes the command or message from the message/command latch 112 through the transceivers 104 and waits for a valid data transfer acknowledgement (DTACK/) 134. If the transferred packet was a read request, the processor would then simply wait for the response packet to be returned which would subsequently be stored in the response latch 114. This is required because of the processor and bus clock non-synchronization, i.e., the bus running faster than the processor. Receipt of a message packet causes the message to be stored in the message latch 110. If a parity error occurs, the receiving mode will generate data transfer acknowledge (DTACK/) 134 and parity error (PERR/) 136 signals indicating that the node being addressed is resident on the fastbus, but the information on the fastbus has questionable validity and is not being accepted. The transmitting node then has the privilege to retry the fastbus cycle after repeating the proper fastbus acquisition sequence over again. A parity error (PERR) counter 174 as shown in FIG. 8A is used to indicate the quality of information transfer on the fastbusses 26, 30. If the addressed device or node is busy because the device simply cannot accept additional information packets at the present time, or the bus coupler 28 FIFO buffers 160 are full, or a latched information packet has not been processed yet, then the receiving node will generate a DTACK/ 134 and BUSY/ 138 signals indicating that the node being addressed cannot accept the information packet 80 at this time. The transmitting node then has the privilege to retry the fastbus cycle after repeating the proper fastbus acquisition sequence over again. After four retries, a system level error is asserted indicating a resource lockout. When an addressed device or node accepts the information packet 80, the parity of the information packet is valid and the receiving node asserts only the signal DTACK/ 134.

As shown in FIG. 7, the bus clock (BUSCLK) 120 signal is 6.7 MHz which provides a 150 ns period or window in which to pass an information packet to a specified destination. A peak transfer rate of 26.8 MBS (million bytes per second) is achieved for 32-bit fastbus operations and 13.3 MBS for 16-bit fastbus operations. When memory interleaving is employed by having even and odd memory banks, as shown in FIG. 2, memory bandwidth may be effectively doubled. In synchronization with the negative going edge of the bus clock 120 signal in FIG. 7 is a bus request (BREQ/) 122 signal. Thirty-five (35) nanoseconds later the bus request 122 is sampled at a bus coupler 28 which causes an arbitration sequence to occur. A delayed version of the bus clock, BUSCLK/+35 ns is then used to clock an output latch which provides a bus grant (BGNT/) 126 signal. The bus grant 126 signal provides a 150 ns window which is used by the requester to (1) enable its bus buffers or transceivers 104 to come out of a tristate mode and begin driving the information packet onto the fastbus; and (2) to turn off its bus request. After allowing the information on the fastbus to settle and for the receiver mode ID comparator and parity tester to begin their operations, a bus valid (BVALID/) 130 is generated which is used to gate the receiver control signals (DTACK/ 134, PERR/ 136 and BUSY/ 138) onto the bus with the positive going edge of BVALID/ 130 being used by the receiver to latch the packet and the control signal states. If the information packet 80 had bad parity, then a parity error (PERR/) 136 signal is generated. If the receiver was busy, then a BUSY/ 138 signal is generated. In both instances, transmission retries are allowed.

Figure 8B:
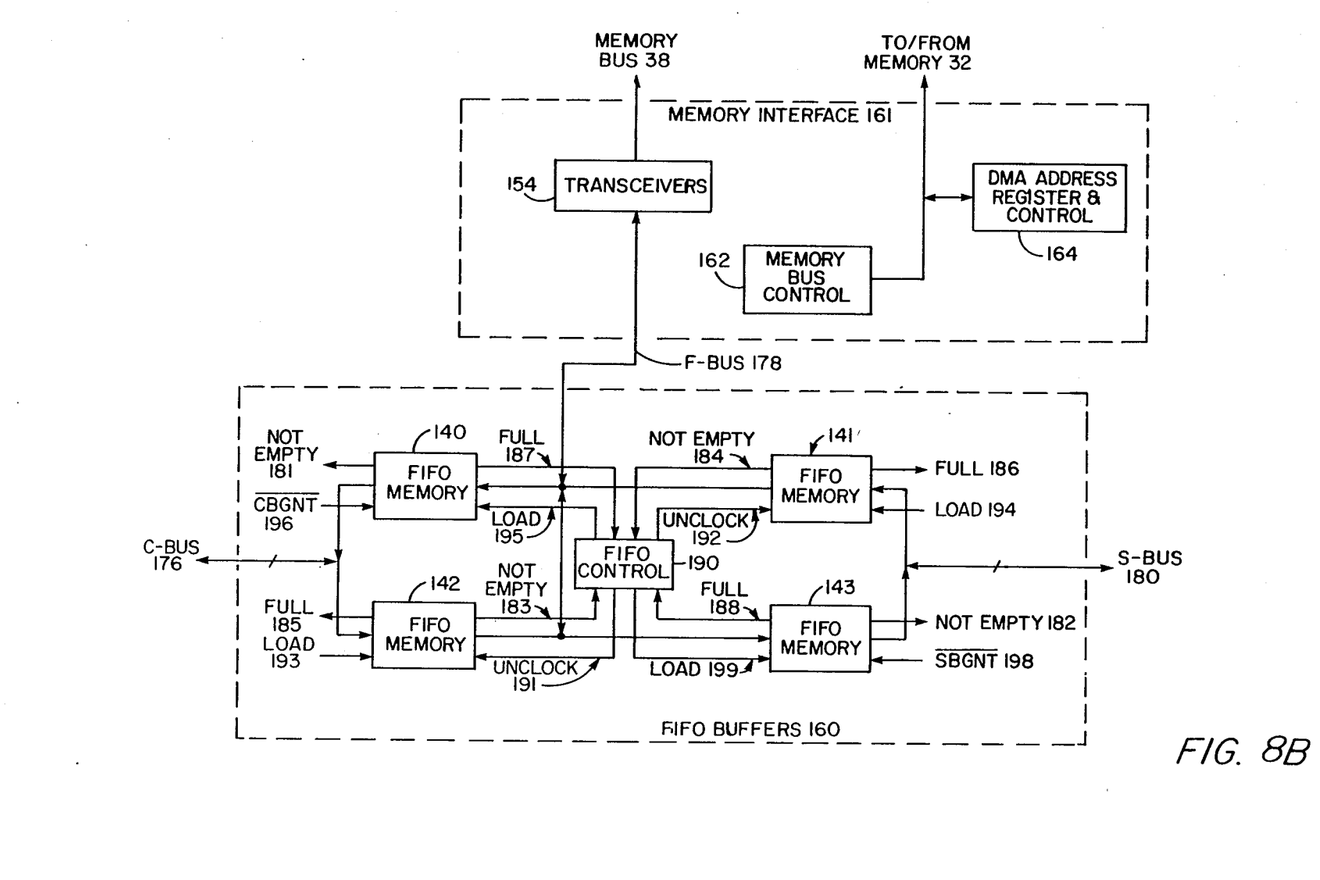
FIG. 8B is a block diagram of the FIFO buffers 160 and memory interface 161.

Referring now to FIGS. 8A and 8B, a block diagram of the bus coupler 28 is shown in FIG. 8A comprising a fastbus interface 22 for coupling to a cluster fastbus 26, a fastbus interface 24 for coupling to a system fastbus 30, a memory interface 161 for coupling to a memory system such as the global memory 32 as shown in FIG. 1, a cluster bus arbiter 150 performing cluster fastbus 26 arbitration, a system bus arbiter 152 for performing system fastbus 30 arbitration and first-in first-out (FIFO) buffers 160 for temporarily storing information packets 80.

The bus coupler 28 also comprises a C-BUS 176 for coupling the fastbus interface 22 to FIFO buffers 160, an S-BUS 180 for coupling the fastbus interface 24 to FIFO buffers 160 and an F-BUS 178 for providing an interface from the FIFO buffers 160 to the memory interface 161. The memory interface 161, as shown in FIG. 8B, comprises transceivers 154 for forming the memory bus 38 for transferring information to and from a memory, memory bus control 162 for controlling the information transfers, and a direct memory access (DMA) address register and control 164 for high speed memory information transfer.

Referring to FIG. 8B, the FIFO buffers 160 comprise a plurality of FIFO memories 140–143. Each FIFO memory 140–143 comprises sixteen words of 64 bits each and may be embodied by a plurality of medium scale integrated (MSI) circuits such as a type SN54LS222 manufactured by Texas Instruments, Inc. of Dallas, Texas which is a sixteen word by 4 bit asynchronous first-in, first-out memory. Sixteen of these devices connected in a horizontal array form each of the sixteen words by 64 bit FIFO memories 140–143. A FIFO memory is a storage device that allows data to be written into and read from its array at independent data rates.

Data is written into and read from the FIFO buffers 160 via the S-BUS 180 or C-BUS 176, depending on the empty or full status of the FIFO memories 140–143. When data is coming from the S-BUS 180 it is loaded into FIFO memory 141 provided a FULL 186 signal is not present and the LOAD 194 signal is generated by the receive control 103. When data is coming from the C-BUS 176 it is loaded into FIFO memory 142 provided a FULL 185 signal is not present and the LOAD 193 signal is generated by the receive control 102. The movement of data within the FIFO buffers 160 is performed by the FIFO control 190 which generates the FIFO memory control signals as shown in FIG. 8B. When data is to be put on the S-BUS 180, the SBREQ 197 signal is generated by the transmit control 101 of the fastbus interface 24 and sent to the system bus arbiter 152 which generates a SBGNT/ 198 signal, and the data from FIFO memory 143 is then read out to the S-BUS 180. When data is to be sent on the C-BUS 176, the CBREQ/ 195 signal is generated by the transmit control 100 of the fastbus interface 22 and sent to the cluster bus arbiter 150 which generates a CBGNT/ 196 signal, and the data from FIFO memory 140 is then read out to the C-BUS 176.

Referring again to FIG. 8A, the fastbus interface 22, which provides a portion of the implementation of the cluster fastbus 26 in conjunction with fastbus interfaces 16–20, has the same transmit control 100, receive control 102 and transceivers 168, (104) as the fastbus interfaces 16–20 shown in FIG. 6. The differences between the two types of fastbus interfaces relate to the particular device being interfaced to the cluster fastbus 26. Hence, fastbus interface 22 comprises the additional function of a parity checker 170 and ID comparator 172 for performing a parity test on the current information packet 80 and for comparing the node ID of the information packet 80 with the ID of the node accepting the information packet 80 to verify that it is the correct node. In addition, there is a parity error counter 174 and a retry counter 166; the retry counter 166 controls the number of retries of an information packet transmission when a busy condition is occurring and the parity error counter 174 permits at least one additional retry for the transmission of the information packet. Fastbus interface 24 provides the interface circuitry between the bus coupler 28 and the system fastbus 30. Its implementation is the same as the fastbus interface 22.

The cluster bus arbiter 150 shown in FIG. 8A performs the arbitration process for determining which one of the processors 10–14 or other devices obtains use of the cluster fastbus 26. The bus coupler 28 itself has the highest priority because it controls the gateway to the main resources being shared and it passes response packets to out-of-cluster or in-cluster requesting devices of processors. Thus, the bus coupler 28 generates its own bus request (CBREQ/) 195 signal from the transmit control 100 and a bus grant (CBGNT/) 196 signal is generated by the cluster bus arbiter 150. The devices on processors 10–14 in a cluster 60 obtain occupancy of the cluster fastbus 26 based on rotating priority. The devices on a cluster fastbus 26 generate bus requests (BREQ/ 0–7) 200 signals and the cluster bus arbiter 150 provides a bus grant (BGNT/ 0–7) 201 signal to the next device in the rotating priority scheme. When a bus grant signal has become active, it produces the BVALID/ 130 signal indicating that a packet is on the fastbus 26 and data is valid unless a parity error (PERR) is generated.

The system bus arbiter 152 of the bus coupler 28 also provides a rotating priority scheme for up to sixteen clusters that may be connected to the system fastbus 30. In addition to bus request (BREQ/) 202 signals and request acknowledge (RACK/) 203 signal there are sixteen priority PRI (0–15) 204 signals, a bus-in-use (BIU/) 205 signal and a user ID code (USER ID 0–3) 206 signal. The particular bus coupler waiting to obtain use of the system fastbus 30 generates its own bus request (SBREQ/) 197 and receives a bus grant (SBGNT/) 198 from the system bus arbiter 152.

Figure 9:
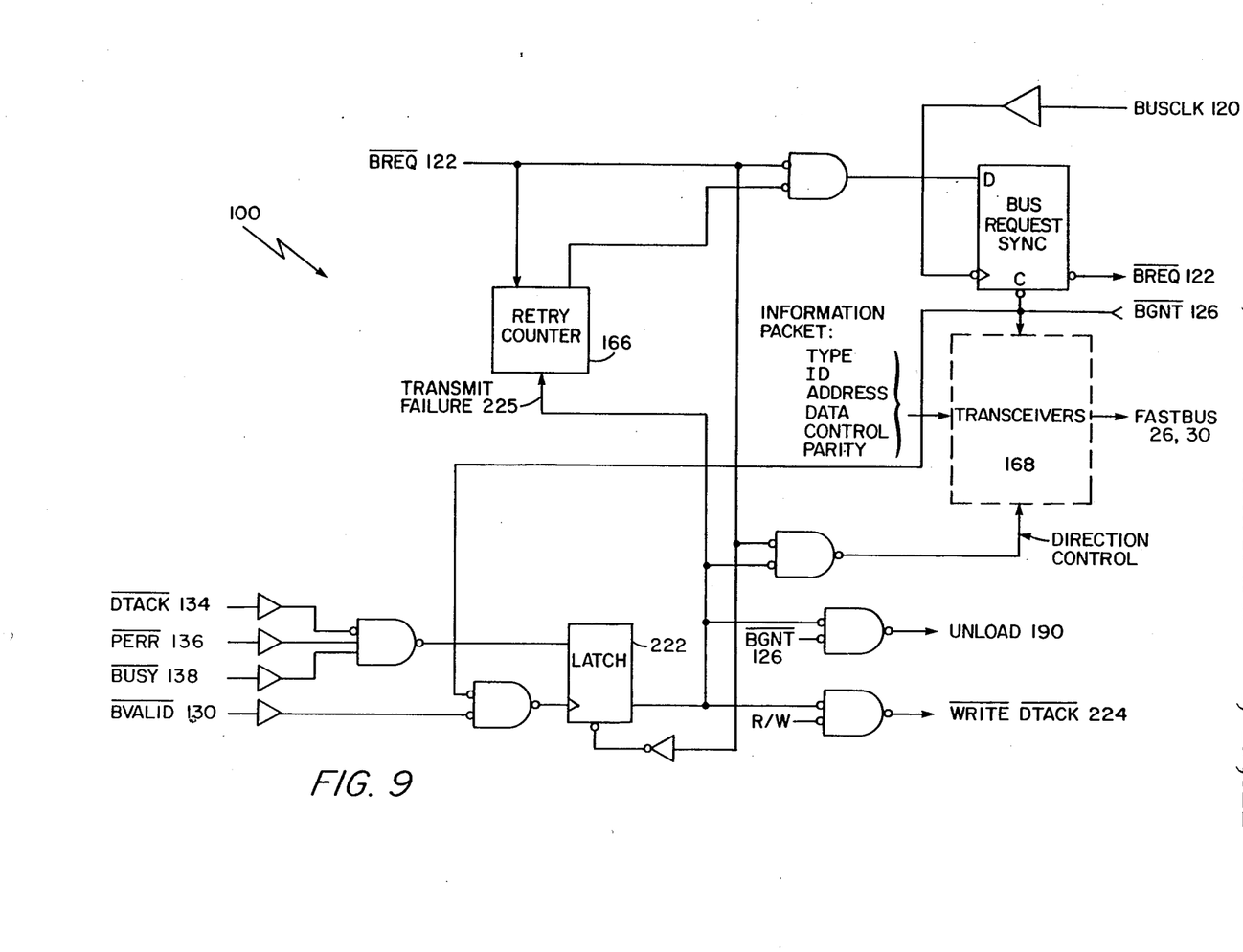
FIG. 9 is a logic diagram of the fastbus transmit control logic.

Referring now to FIG. 9, there is shown a logic diagram of the fastbus transmit control 100 logic. A decoded memory address produces a bus request (BREQ/) 122 signal and puts the bidirectional transceivers 168 into a transmit mode. The transceiver 168 (also shown in FIG. 8A) may be embodied by a 3-state bidirectional transceiver model 74ALS245 as manufactured by Texas Instruments of Dallas, Texas which comprises eight non-inverting bidirectional buffers. A bus clock (BUSCLK) 120 signal clocks the BREQ/ 122 signal. Each device or node within a cluster 10–14 or a system comprising a plurality of clusters 60–64 has an individual bus request (BREQ/) 122 and bus grant (BGNT/) 126 signal. When an arbiter 150, 152 of the bus coupler 28 passes the BGNT/ 126 signal to the requestor, the BGNT/ 126 signal clears the bus request sync 220 and enables the transceivers 168 to assert an information packet onto the fastbus 26, 30, initiating a 150 ns transfer window. When bus valid (BVALID/) 130 occurs, the receiver node asserts the appropriate handshake signal (DTACK/ 134, PERR/ 136, BUSY/ 138) as shown in the FIG. 7 timing diagram. On the positive edge of BVALID/ 130, the status of the information packet transfer handshake is latched by latch 222. If the transfer had a problem such as a parity error (PERR/) 136 or a receive node BUSY/ 138 signal, then a retry occurs. If the transfer is complete, then the bus request 122 is disabled from producing more bus requests, the fastbus transceivers 168 are put into a receive mode and, if the request packet is a WRITE REQUEST, then a processor WRITE DTACK/ 224 signal is asserted completing the processor's memory cycle. If the request packet is a READ REQUEST, then the processor is simply put into a wait state until the read data packet arrives from the fastbus 26, 30. The transmit cycle retry function comprises a retry counter 166 to control the number of retries. Typically two retries are permitted for parity errors and four retries are permitted for a busy condition.

Figure 10:
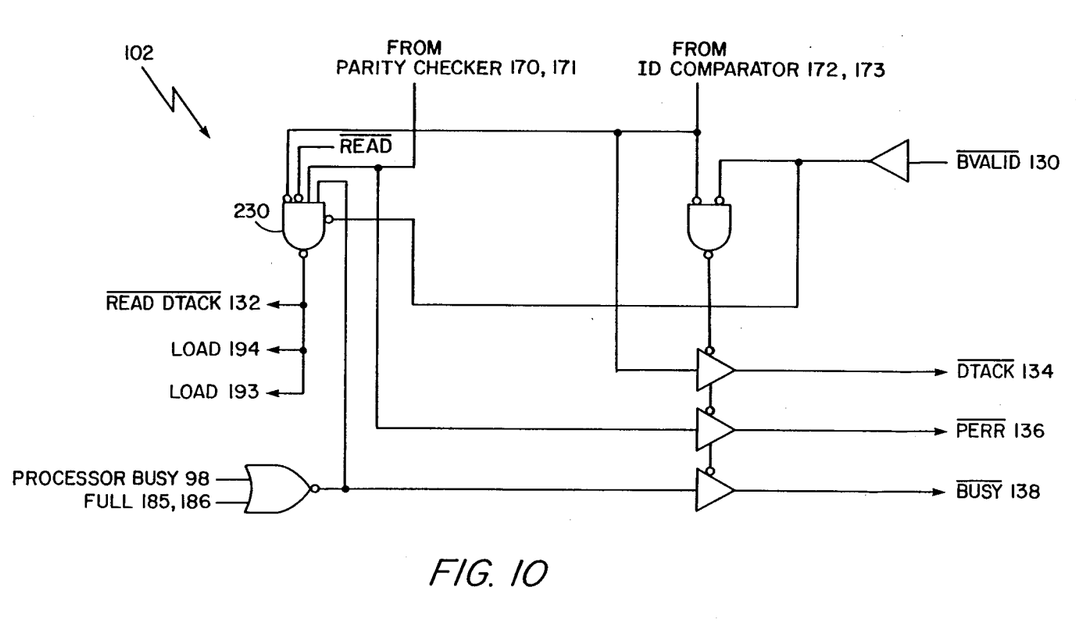
FIG. 10 is a logic diagram of the fastbus receive control logic.

Referring now to FIG. 10, there is shown a logic diagram of the fastbus receive control 102 logic. When a device node is not tranmitting, it is "listening" to the fastbus 26, 30 for information packets 80 addressed to that node. When an information packet 80 is on the fastbus 26, 30, the information begins propagating through the transceivers 168, the ID comparator 172 and parity checker 170. When the bus valid (BVALID/) 130 signal occurs, if the information packet ID compares with the appropriate node ID, a data transfer acknowledge (DTACK/) 134 signal is generated and the receiver node asserts the handshake signals. If the transfer is a valid one (no parity error (PERR/) 136 and no BUSY/ 138 condition, then NAND gate 230 generates a READ DTACK/ 132 signal which is asserted at the processor completing the processor's global memory 32 read cycle. The LOAD 193 and 194 signals are also generated by NAND gate 230 for loading the bus coupler 28 FIFO memory 141 and FIFO memory 142.

This concludes the Description of the Preferred Embodiment. However, many modifications and alterations would be obvious to one of ordinary skill in the art without departing from the spirit and the scope of the inventive concept. Therefore, it is intended that the scope of this invention be limited only by the appended claims.

What is claimed is:

1. In combination:
a plurality of devices, each of said devices comprising means for generating an information packet;
a first synchronous bus means for interconnecting said plurality of devices forming a cluster and for transferring said information packet on said bus means within one clock cycle time, said generating means of said devices receiving a packet transfer acknowledge signal within said one clock cycle time;
a bus coupler means coupled to said first synchronous bus means and a second synchronous bus means for storing and forwarding said information packet to a specified destination in accordance with said information packet.

2. The combination as recited in claim 1 wherein:
said bus coupler means further comprises means for controlling a bidirectional flow of a plurality of information packets to and from said bus coupler means.

3. The combination as recited in claim 1 wherein:
said information packet comprises a parallel digital word having a plurality of fields, one of said fields performing node identification of each of said plurality of devices.

4. The combination as recited in claim 1 wherein:
said bus coupler means further comprises means for determining said specified destination of said information packet in accordance with an address field of said information packet.

5. The combination as recited in claim 1 wherein
said bus coupler means comprises a first-in first-out memory means for temporarily storing a plurality of information packets.

6. The combination as recited in claim 1 wherein:
said bus coupler means further comprises arbiter means for determining which one of said devices obtains first use of said first synchronous bus means, said bus coupler means having the highest priority use of said first synchronous bus.

7. In combination:
a plurality of devices, each of said devices comprising means for generating an information packet;
a first synchronous bus means for interconnecting said plurality of devices forming a cluster and for transferring said information packet on said bus means within one clock cycle time, said generating means of said devices receiving a packet transfer acknowledge signal within said one clock cycle time;

a bus coupler means having a first port coupled to said first synchronous bus means for storing and forwarding said information packet to a specified destination; and a second synchronous bus means coupled to a second port of said bus coupler means for routing said information packet to and from said bus coupler means.

8. The combination as recited in claim 7 wherein: said bus coupler means comprises a third port for routing said information packet to a storing means.

9. The combination as recited in claim 7 wherein: said bus coupler means further comprises means for controlling a bidirectional flow of a plurality of information packets to and from said bus coupler means.

10. The combination as recited in claim 7 wherein: said information packet comprises a parallel digital word having a plurality of fields, one of said fields performing node identification of each of said plurality of devices.

11. The combination as recited in claim 7 wherein: said bus coupler means further comprises means for determining a destination of said information packet in accordance with an address field of said information packet.

12. The combination as recited in claim 7 wherein: said bus coupler means comprises a first-in first-out memory means for temporarily storing a pluality of information packets.

13. The combination as recited in claim 7 wherein: said bus coupler means comprises a first arbiter means for determining when one of said devices in said cluster obtains first use of said first synchronous bus means and a second arbiter means for determining when said information packet is transferred to or from said bus coupler means on said second synchronous bus means.

14. A digital system comprising:
a synchronous system fastbus means for routing an information packet within said digital system;
a plurality of clusters interconnected by said system fastbus means;
each of said clusters comprising a plurality of devices interconnected by a synchronous cluster fastbus means for transferring said information packet on said cluster fastbus means within one clock cycle time, said devices receiving a packet transfer acknowledge signal within said one clock cycle time; and
a bus coupler means in each of said clusters connected between said cluster fastbus means and said system fastbus means for storing said information packet and routing said information packet to a destination in said digital system within one clock cycle time.

15. The digital system as recited in claim 14 wherein: said bus coupler means comprises a port for routing said information packet to a storing means.

16. The digital system as recited in claim 14 wherein: said bus coupler means further comprises means for controlling a bidirectional flow of said information to and from said system fastbus means and said cluster fastbus means.

17. The digital system as recited in claim 14 wherein: said information packet comprises a parallel digital word having a plurality of fields, one of said fields being an address field for determining a destination node for said information packet.

18. The digital system as recited in claim 17 wherein: said plurality of fields within said information packet comprises a message type field for enabling one of said devices in one of said clusters to send a message to any other device in said digital system or to all devices simultaneously in said digital system.

19. The digital system as recited in claim 14 wherein: said bus coupler means comprises a first-in first-out memory means for temporarily storing a plurality of information packets.

20. The digital system as recited in claim 14 wherein: said bus coupler means in each of said clusters comprises a first arbiter means for determining which one of said devices in each of said clusters obtains use of said cluster fastbus and a second arbiter means for determining when said bus coupler means obtains use of said system fastbus.

21. The digital system as recited in claim 14 wherein: said cluster fastbus means comprises an interface to each of said plurality of devices further comprising:
a transmit control means for controlling the transfer of an information packet from one of said plurality of devices to said bus coupler means; and
a receive control means for controlling the transfer of an information packet from said bus coupler means to one of said plurality of devices.

22. The digital system as recited in claim 14 wherein: said bus coupler means comprises a first interface to said cluster fastbus means and a second interface to said system fastbus means, each of said first interface and said second interface comprising:
a transmit control means for controlling the transfer of an information packet from said bus coupler means; and
a receive control means for controlling the transfer of an information packet to said bus coupler means.

23. A method of transferring parallel digital information among a plurality of devices arranged in clusters within a digital system comprising the steps of:
generating in a first one of said plurality of devices an information packet comprising a plurality of fields including address, data and control fields;
transferring said information packet on a synchronous cluster fastbus means interconnecting said plurality of devices within one clock cycle time;
receiving at said first one of said generating devices a packet transfer acknowledge signal within said one clock cycle time; and
storing and forwarding said information packet in a bus coupler means coupled to a synchronous system fastbus means, said bus coupler means having at least a first port and a second port for receiving and forwarding said information packet.

24. The method as recited in claim 23 wherein: said step of storing and forwarding said information packet comprises forwarding said information packet to said synchronous system fastbus for transfer to a second one of said plurality of devices in one of said clusters, said transfer on said system fastbus occurring within one clock cycle time.

* * * * *